March 27, 1951 — R. WARREN — 2,546,282
VARIABLE-SPEED GEARING
Filed Feb. 15, 1946 — 3 Sheets-Sheet 1
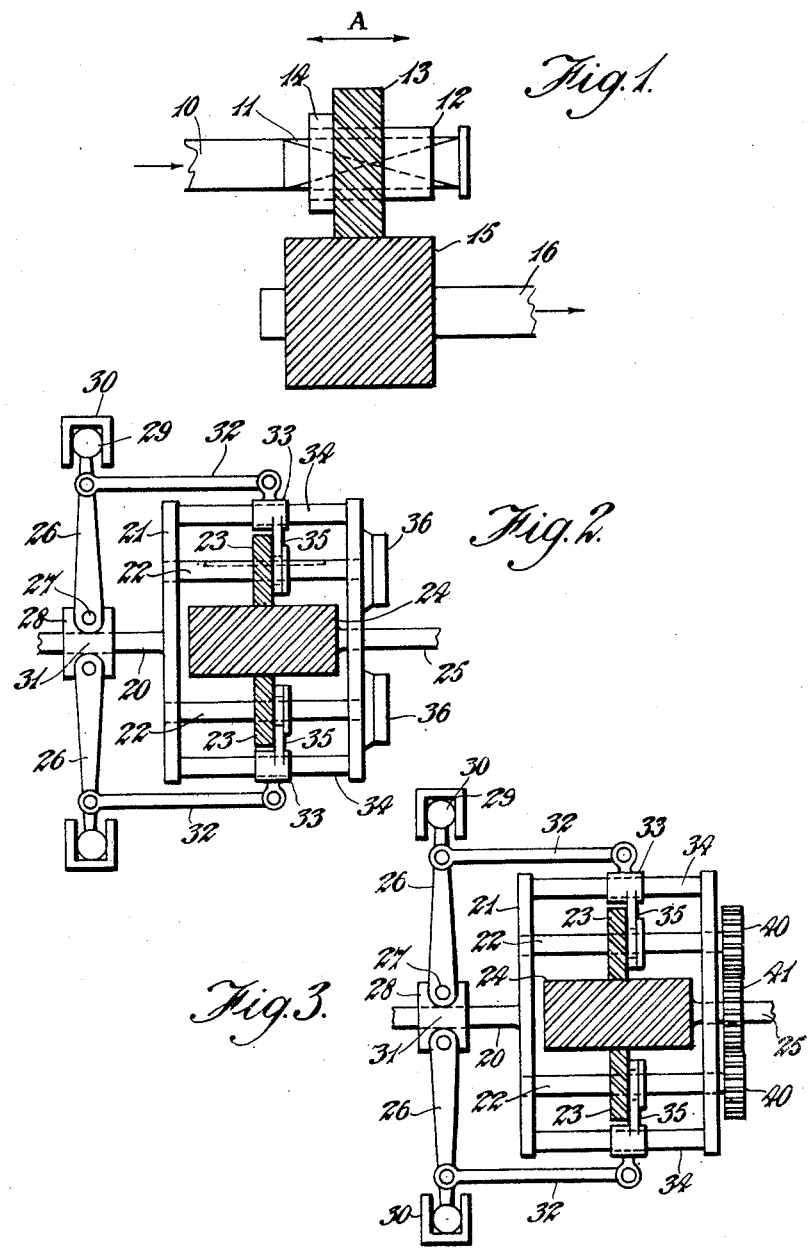
INVENTOR
REGINALD WARREN

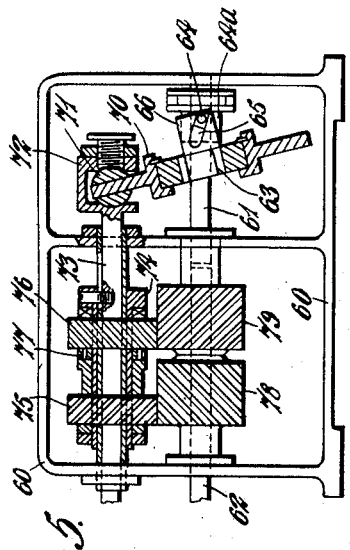
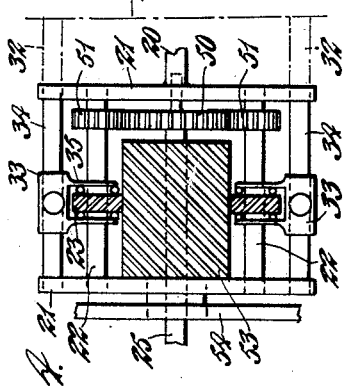

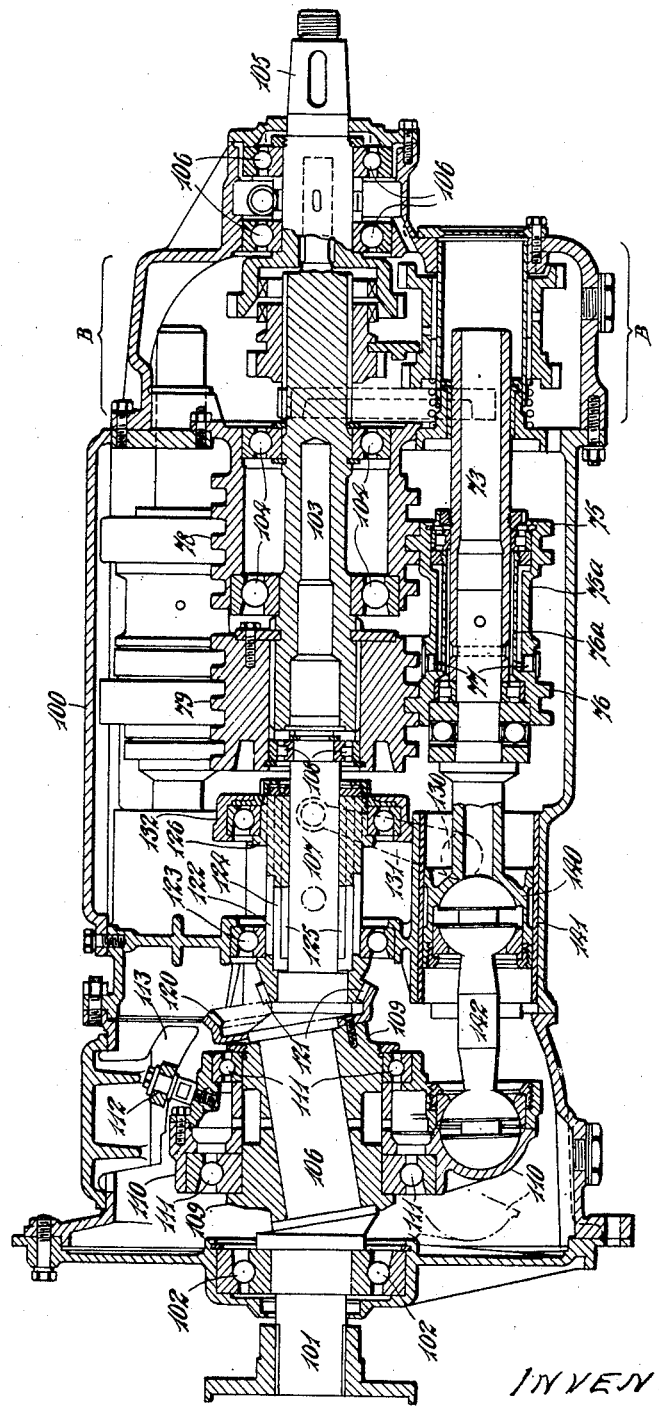

Patented Mar. 27, 1951

2,546,282

UNITED STATES PATENT OFFICE 2,546,282

VARIABLE-SPEED GEARING

Reginald Warren, Dorking, England

Application February 15, 1946, Serial No. 647,783
In Great Britain May 8, 1944

Section 1, Public Law 690, August 8, 1946
Patent expires May 8, 1964

16 Claims. (Cl. 74—63)

This invention relates to improvements in variable speed gearing, and has for its chief object to provide a new means whereby a positive drive with an easily adjustable variation of speed can be obtained with the use of constant mesh gears of normal tooth design. Further objects of the present invention will be in part obvious from the following description and in part specifically referred to hereinafter.

In its broadest aspect the variable speed gear according to the present invention is characterised by the provision therein of a driving gear wheel engaging with a gear wheel on the driven shaft, means for axially reciprocating one of said gear wheels relative to the other, means for converting the relative axial movement of the gear wheels into rotary movement of the driven shaft, means for holding one of the gear wheels against rotation on its shaft whilst the axially moving gear wheel is travelling in one direction only, whereby a unidirectional drive is applied to the driven shaft, and means for varying the amplitude of the reciprocation in order to vary the gear ratio.

For the purpose of converting the relative axial movement of the gear wheels into rotary movement of the driven shaft, the constantly meshing gear wheels are preferably provided with helical teeth of 45° angle, but any other means may be provided to this end without departing from the scope of the present invention. For example, the constantly meshing gear wheels may have straight teeth and may be mounted on shafts having helical threads or grooves co-operating with similar threads or grooves bored in the said wheels.

The variable speed gear according to the present invention may, however, take many other forms. For example, in one embodiment of the present invention the variable speed gear comprises at least one gear wheel axially slidable on a shaft, a second gear wheel on the driven shaft engaging with said first-mentioned gear wheel or gear wheels, a swash plate or similar mechanism for reciprocating said first-mentioned gear wheel or gear wheels backwards and forwards, means, for example helical teeth on the engaging gear wheels, for converting the reciprocatory movement of the first-mentioned gear wheel or gear wheels into rotary movement of the driven shaft when said gear wheel or gear wheels is or are held against rotation, means for holding said first-mentioned gear wheel or gear wheels against rotation during their travel in one direction only, and means for varying the angularity of the swash plate or like device to vary the gear ratio of the transmitted drive.

In a further embodiment of the present invention, the variable speed gear comprises a swash plate or similar device, one or more lay shafts operatively connected to said swash plate or the like and arranged parallel to but spaced from the effective axis of the swash plate or the like, a driving shaft adapted to cause relative rotation between at least a part of the swash plate or the like and the lay shaft or lay shafts, about the effective axis of the swash plate or the like, to cause the lay shaft or lay shafts to be reciprocated by reason of their engagement with or connection to the swash plate or the like, helical or like suitable gearing coupling the lay shaft or lay shafts to a driven shaft so as to convert the reciprocatory movement of the lay shaft or lay shafts into rotary movement of the driven shaft, means to ensure that the lay shaft or lay shafts is or are effectively effectively coupled to the driven shaft to drive the same whilst moving in one direction only so as to provide a unidirectional drive to the driven shaft, and means for varying the angularity of the swash plate or the like in order to vary the gear ratio.

In yet another form of the present invention, the variable speed gear comprises a swash plate or similar device adapted to be driven by a driving shaft, one or more lay shafts adapted to be reciprocated by the swash plate or the like as it is driven, helical or like suitable gearing coupling the lay shaft or lay shafts to a driven shaft so as to convert the reciprocatory movement of the lay shaft or lay shafts into rotary movement of the driven shaft, means to ensure that the lay shaft or lay shafts is or are effectively coupled to the driven shaft to drive the same whilst moving in one direction only to secure a unidirectional movement of the driven shaft, and means for varying the angularity of the swash plate or the like relative to the axis of rotation of the driving shaft in order to vary the gear ratio.

In still another form of the present invention, the variable speed gear comprises a swash plate or similar device, one or more lay shafts carried by a cage rotatable about the main through axis of the gear, means operatively connecting said lay shaft or lay shafts to the swash plate or the like, whereby rotation of the said cage causes reciprocation of the lay shaft or lay shafts, a driving shaft adapted to cause rotation of the said cage relative to the said swash plate or the like, helical or like suitable gearing coupling the lay shaft or lay shafts to a driven shaft so as to convert the reciprocatory movement of the lay shaft or lay shafts into rotary movement of the driven shaft, means to ensure that the lay shaft or lay shafts is or are effectively coupled to the driven shaft to drive the same whilst moving in one direction only, thereby producing a unidirectional movement of the driven shaft, and means for varying the angularity of the swash plate or the like relative to the axis of rotation of the cage in order to vary the gear ratio.

The last three described embodiments may, if desired, and as will be more fully described hereinafter, be modified in such a manner that the lay shafts themselves are not reciprocated but are provided with sleeves which are reciprocated, these sleeves being provided with helical or like gear wheels and functioning in the same way as the lay shafts to secure the desired result.

Many other novel and advantageous features of construction, operation and arrangement are provided by the present invention, these features being fully described hereinafter and claimed in the appended claims.

In order that this invention may be the more clearly understood and readily carried into effect, I will proceed to describe the same with reference to the accompanying drawings, which illustrate certain embodiments of the present invention by way of example only, and in which:

Figure 1 is a simple diagrammatic view which serves to illustrate the underlying principle of the present invention.

Figure 2 is an elevation illustrating one simple form of variable speed gear according to the present invention.

Figure 3 is a view illustrating a modified form of the variable speed gear shown in Figure 2.

Figure 4 is a view illustrating a further modification of the gear shown in Figure 2.

Figure 5 is a view illustrating a further embodiment, one in which the lay shafts are reciprocated backwards and forwards and are held against rotation about the axis of the driven shaft.

Figure 6 is a view illustrating a more elaborate form of variable speed gear, having certain advantages which will be more fully described hereinafter, and Figure 7 is a view of another more elaborate form of variable speed gear according to the present invention incorporating novel and efficient means for varying the angularity of the swash plate or the like to vary the gear ratio.

Referring now to Figure 1 of the accompanying drawings, this is, as stated above, intended merely to illustrate the underlying principle of the present invention and is not presented as a construction having any major practical application, although it may be found useful where it is desired to provide a variable step by step rotary drive. A fixed shaft or rod 10 has a squared or splined end 11 on which is mounted a bush 12. The bush 12 is internally squared or splined so that whilst it is free to slide axially on the end of the shaft 10 it cannot rotate thereon. Mounted on the outside of the bush 12 is a 45° angle helical gear wheel 13, which is coupled to the bush 12 by a free wheel or one-way drive device of any suitable construction illustrated diagrammatically at 14. The helical gear wheel 13 meshes constantly with a corresponding 45° angle helically toothed gear wheel 15 keyed to the driven shaft 16. Power is applied to the gear to oscillate the gear wheel 13 backwards and forwards on the rod 10, as indicated by the arrow A. Now it will be obvious from the engagement of the teeth of the helical gear wheels 13 and 15 that, as the gear wheel 13 is oscillated backwards and forwards relative rotation must take place between the gear wheels. If the gear wheel 13 were held against rotation in either direction on the shaft 10, the driven shaft 16 would be merely rocked backwards and forwards by equal amounts but, due to the provision of the free wheel or one-way drive device 14, the helical gear wheel 15 (and hence the driven shaft 16) will be rotated when the gear wheel travels in one direction (the free wheel being locked), whereas, when the gear wheel 13 is moved in the other direction, the gear wheel 15 will remain stationary and the gear wheel 13 will rotate on the bush 12 since the free wheel is no longer locked and the reaction of the driven shaft is the greater.

Hence the oscillatory movement of the gear wheel 13 is converted into unidirectional step by step movement of the driven shaft 16. It will further be obvious that the amount of drive applied to the driven shaft, or, in other words, the arc over which it is moved, is directly dependent on the amplitude of oscillation of the gear wheel 13.

In order, therefore, to produce a practical form of variable speed gear, it is merely necessary, firstly, to provide a plurality of gear wheels such as 13 spaced around the helical gear wheel 15 and to operate them successively so that a continuous (or substantially continuous) drive is applied to the driven shaft 16 and, secondly, to provide means for varying the amplitude of the oscillations of the gear wheels 13. A step by step variation of the amplitude of the oscillation of the gear wheels 13 will give a step by step variation of the gear ratio, whereas, if the amplitude can be varied by infinitely small amounts an infinitely variable speed gear will be obtained. It is towards the achievement of this latter object, i. e., the provision of an infinitely variable speed gear, that the present invention is more particularly directed and the embodiments illustrated in the drawings attain this object. The present invention is not, however, limited to infinitely variable speed gears as it is also applicable to step by step gears, as above explained.

It should be noted that in the description of Figure 1 the gear wheels 13 and 15 have been referred to as 45° angle helically toothed gear wheels. This, from a practical point of view, is the most convenient, but it is by no means limitative of the present invention. All that is necessary is that some means should be provided for converting the reciprocatory movement of the gear wheel 13 into rotary movement of the gear wheel 15, or more broadly stated that relative axial movement between the gear wheels should be converted into rotary movement of the gear wheel 15 since in Figure 1 the same result could be obtained by axially reciprocating the gear wheel 15 instead of the gear wheel 13, or in addition to the same. For example, the gear wheels 13 and 15 may be straight toothed gears and that one which is reciprocated (or each of them if they are both reciprocated) may be mounted on a shaft having a helical thread or groove co-operating with a similar thread or groove bored in the gear wheel. For simplicity of description, however, it will be assumed that the preferable helical toothed gearing is employed and will for this reason be described hereinafter.

Turning now to Figure 2 of the accompanying drawings, in the construction therein illustrated the driving shaft 20 carries a support in the form of a rotating cage 21 in which are mounted a plurality of lay shafts 22. Each lay shaft is provided with a helically toothed gear wheel 23 (corresponding to the gear wheel 13 of Figure 1) which is axially slidable but non-rotatable thereon, being, for example, splined thereon. The helical gear wheels 23 engage with a central helically toothed gear wheel 24 (corresponding to the gear wheel 15 of Figure 1), this gear wheel 24 being keyed to the driven shaft 25 which passes freely through the further end of the cage 21.

Now from the above description it will be appreciated that two things are necessary to convert such a construction into a satisfactory variable speed gear, firstly, to provide adjustable means for oscillating the gear wheels backwards and forwards on the lay shafts 22 and, secondly, to provide means for ensuring that the drive is effectively transferred to the gear wheel 24 when the gear wheels 23 are moving in one direction only.

The means for oscillating the gear wheels 23 comprise a plurality of radial arms 26 pivoted at 27 on a boss 28 and having at their outer ends balls or slipper pads 29 running in an internally grooved swash plate annulus 30. The annulus 30 is pivoted on an axis 31 so that it can, by suitable means (not shown), be swung to various degrees of angularity relative to a plane at right angles to the axis of rotation of the driving shaft, as shown in dotted lines. Each arm 26 is connected by a pivoted link 32 to a sleeve 33 on a guide rod 34 carried by the cage, the sleeve 33 being provided with a stirrup 35 embracing a neck on the gear wheel so that, whilst the gear wheel 23 is still free to revolve, it is caused to follow, axially, the movements of the sleeve 33.

The throw to the sleeves 33 is controlled by the setting of the swash plate annulus 30 and as the amplitude of the reciprocation of the gear wheels 23 is the same as the throw of the sleeves 33, it follows, as explained above, that the gear ratio can be controlled by adjustment of the swash plate annulus 30. The actual operation of this form of gear will be described more fully hereinafter.

The means for ensuring that the gear wheels 23 are effective whilst travelling in one direction only comprise clutch devices 36 located on one end plate of the cage 21, these one-way drive devices 36 being effective to prevent rotation of the lay shafts 22 when required.

Let us now consider the operation of this form of gear. With the swash plate annulus 30 lying in a plane at rgiht angles to the axis of rotation of the driving shaft 20, the gear wheels 23 will not be reciprocated at all and it follows that, as lay shafts 22 and hence the gear wheels 23 are prevented from rotating in one direction by the clutch devices 36, the gear wheels 23 and 24 will be locked and 1 to 1 ratio or direct drive will be obtained. When, however, the swash plate annulus is tilted out of this plane at right angles to the driving shaft 20, as shown for example in dotted lines, then the gear wheels 23 will be axially reciprocated relative to the gear wheel. Hence since this reciprocation results in relative rotation of the gear wheels 23 and 24 and the gear wheels 23 are prevented from rotating when travelling in one direction, this reciprocation of the gear wheels 23 will result in a rotary movement of the driven shaft relative to the cage. This, therefore, modifies the 1 to 1 ratio which was obtained and gives rise to a speed reduction, the amount of which obviously depends on the angularity of the swash plate annulus 30 relative to the axis of the driving shaft 20. The greater this inclination the greater will be the reduction until, with suitably proportioned parts, it is possible to arrive at a point where the rotation of the driven shaft relative to the cage, due to reciprocation of the gear wheels 23, is equal and opposite to the rotation of the cage itself, in which case the gear will be in neutral. Further inclination of the swash plate annulus 30 beyond this point will give a reverse, as will be readily understood.

The minimum number of lay shafts which it will be found practical to use is three if a reasonably smooth rotation of the driven shaft is desired. The greater number of lay shafts and gear wheels 23 about the gear wheel 24 the more steady will be the rotation of the driven shaft. The gear wheels 23 will not interfere with one another in their operation of the driven shaft due to the presence of the clutch devices 36 which will allow an over-run when required.

Of course, if desired, the gear wheels 23 may be fixed on the lay shafts 22 which are then themselves reciprocated to secure the same result.

With the construction just described it will be seen that variation of the speed is obtained by what is, in effect, a modification of a prearranged ratio, i. e., the 1 to 1 ratio obtained when the swash plate annulus lies in a plane at right angles to the axis of rotation of the driving shaft. This is not necessary, as will be appreciated on reference to Figure 3. The gear shown in Figure 3 is substantially the same as that shown in Figure 2 and, in order to avoid repetition, like reference numerals have been used to indicate like parts and no further description will be given of the common parts.

In the gear shown in Figure 3, the lay shafts 22 extend through the further end of the cage and are each provided with a pinion 40 engaging with a central sun pinion 41. The sun pinion 41 is fixed in a suitable manner to the casing of the gear (not shown), i. e., the driven shaft 25 passes freely through it and the pinions 40 and 41. The free wheel or one-way drive devices 36 for the lay shafts 22 are arranged within the pinions 40, or in any other position that may be found desirable. Now with such a construction it will be seen that rotation of the cage 21 will cause the lay shafts to be rotated on their own axes due to the engagement of the pinions 40 with the sun pinion 41, the free wheel devices being arranged to permit this rotation. Consequently, with the swash plate annulus 30 in a plane at right angles to the axis of rotation of the driving shaft, the gear wheels 23 will merely roll round the gear wheel 24. No movement will be applied to the gear wheel 24 since the pinions 23 are not reciprocated and the gear will be in neutral. When, however, the swash plate annulus is tilted out of this plane, the gear wheels 23 will be oscillated backwards and forwards and hence the driven gear 24 will be rotated. In effect the provision of the sun and planet pinions 41, 40 serves to neutralise the rotation of the cage around the driven shaft and to bring the gear back to the form shown in Figure 1. As the swash plate annulus 30 is inclined more and more away from a plane at right angles to the axis of rotation of the driving shaft 21 so will the amount of movement applied to the driven shaft be increased and the reduction ratio reduced until, with suitably proportioned parts, it is possible to secure a 1 to 1 ratio.

Turning now to Figure 4, the gear therein illustrated has certain parts, i. e. cage, lay shafts, helical gear wheels 23 and means for reciprocating the same in common with the gear shown in Figure 2, and like reference numerals have been used to indicate like parts, further description of these parts being deemed to be unnecessary.

In the construction shown in Figure 4, the driven shaft 25 is not provided with a helically toothed gear wheel but with a straight toothed gear wheel 50 which acts as a sun wheel to straight toothed gear wheels 51 carried by the lay shafts 22. The free wheel or one-way drive devices for the lay shafts 22 are provided as before and may be located in the planet pinions 51, or in any other position that may be found to be desirable. The helical toothed gear wheels 23 in this case engage with a central helically toothed gear wheel 53 which is fixed to the support or casing 54 of the gear. The helical gear wheel 53 and the sun pinion 50 on the driven shaft 25 are of equal diameter as are the helical toothed gear wheels 23 and the planet pinions 51.

Now it will be seen that in operation the variable speed gear shown in Figure 4 is similar in many respects to that shown in Figure 3. When the swash plate annulus 30 lies in a plane at right angles to the axis of rotation of the driving shaft 20, the gear wheels 23 will not be reciprocated and as the cage is rotated the lay shafts will be rotated about their own axes due to the engagement of the helical toothed gears 23 with the fixed helical toothed gear 53. Since, however, the planet pinions 51 are of the same diameter as the gear wheels 23 and the sun pinion 50 is of the same diameter as the fixed helical gear wheel 53, the cage 21 will rotate idly about the driven shaft and no power will be transmitted. When the swash plate annulus is inclined away from this position, the gear wheels 23 will be oscillated and a drive, varying according to the inclination of the swash plate annulus, will be transmitted to the driven shaft 25 in a manner very similar to that of the gear shown in Figure 3, as will be readily understood. It may be noted that, if the helical gear wheel 53 be fixed to the cage 21 instead of to the casing 54, the gear will become similar to that illustrated in Figure 2, i. e., a 1 to 1 ratio will be obtained with the swash plate annulus in a plane at right angles to the axis of the driving shaft.

Now it will be appreciated that with all the constructions of gear so far described comparatively substantial variations of the inclination of the swash plate annulus are necessary to secure substantial variations of the gear ratio and, it will be obvious that from the practical point of view, anything which will enable the stroke or amplitude of oscillation of the gear wheels 23 to be reduced whilst still obtaining the same degree of variation of the gear ratio may be an advantage for certain applications of the gear. It is in this respect that a modification of the construction shown in Figure 4 (which modification is incorporated in the other embodiments of the present invention hereinafter described) is of particular advantage.

Thus, if, in the construction shown in Figure 4, both gear trains 53, 23 and 50, 51, are helically toothed and of opposite angles, then the amplitude of oscillation required to secure any given gear ratio will be one-half that which would otherwise be necessary which obviously is of advantage.

Referring now to Figure 5 of the accompanying drawings, the gear illustrated therein differs from the constructions illustrated in Figures 2 to 4 mainly in that the lay shafts are not carried in a rotating cage. This embodiment of the present invention comprises a support in the form of a fixed outer casing 60, a driving shaft 61 and a driven shaft 62 journalled therein. A swash plate boss or like element 63 is mounted on the driving shaft 61 in such a manner that it is rotated thereby whilst, at the same time, it is capable of adjustment to vary the throw. This connection is indicated diagrammatically by means of the pin 64 outstanding from a sleeve 64a surrounding the driving shaft, which pin takes into an inclined slot 65 in a boss 66 extending rearwardly from the swash plate element 63. The sleeve 64a is slidably but nonrotatable on the driving shaft, and it will be appreciated that, as the sleeve is caused to slide backwards and forwards along the driving shaft (by means not shown), the angle of inclination of the swash plate element 63 relative to the axis of rotation of the driving shaft 61 may be varied at will. The means for operating the swash plate elements 63 and also for adjusting its angularity relative to the axis of rotation of the driving shaft shown in this figure are largely diagrammatic but will serve for the explanation of this form of the present invention. More practical methods of securing the desired operation are described hereinafter.

Surrounding the swash plate element 63 is a swash plate 70 which is not rotated by the swash plate element but merely wobbled, means being provided, if desired, to prevent the swash plate rotating whilst still leaving it free to wobble in the required manner.

At the appropriate points around its periphery the swash plate 70 is provided with a ball or like slipper pad bearing 71, one for each lay shaft, each slipper pad 71 being housed within an appropriate housing 72 at the end of the lay shaft 73 which is mounted in the casing 60 in such a manner that it may move backwards and forwards. Three or more lay shafts are arranged around the swash plate 70, only one being shown in the drawing for the sake of simplicity. It will be seen that the swash plate element 63 and swash plate 70 form a means of converting the rotary movement of the driving shaft 61 into reciprocatory movement of the lay shafts 73 and also for varying the amplitude of the reciprocation of the lay shafts, which variation is employed in accordance with the present invention to secure a variation of the gear ratio. Fixed to each lay shaft 73 is a sleeve 74 carrying two 45° angle helically toothed gear wheels 75 and 76 arranged at opposite angles as shown. These gear wheels 75 and 76 are free on the sleeve 74 but are coupled together by a free wheel or one-way drive of a suitable construction, illustrated diagrammatically at 77, so that relative rotation between them is possible in one direction only.

The helical gear wheel 75 engages with a helically toothed gear 78 fixed to the casing 60 of the gear, whilst the helical gear wheel 76 meshes with a helically toothed gear wheel 79 (of opposite angle to the gear wheel 78) fixed to the driven shaft 62.

We thus have a gear which is in effect the same as the modified form of the construction shown in Figure 4 above described.

With the swash plate disposed in a plane at right angles to the axis of rotation of the driving shaft 61, there will be no reciprocation of the pinions 75 and 76 since the swash plate element 63 will idle round inside the swash plate and no drive will be imparted to the driven shaft 62. The gear will thus be in neutral.

When, however, the swash plate is inclined, the lay shafts will be reciprocated backwards and forwards in succession, the amplitude of the oscillation depending on the setting of the swash plate.

It will be sufficient to consider the operation of a single lay shaft, it being remembered that the drive to the driven shaft is taken up by the lay shafts in succession so that whilst it would appear from the description of the operation of a single lay shaft that there are periods when no drive is being transmitted to the driven shaft this is, in fact, not so and that if three or more lay shafts are employed the drive to the driven shaft will be continuous, or substantially continuous.

When the swash plate 70 is inclined, the lay shaft 73 will be reciprocated backwards and forwards, as above stated, carrying with it the helical gear wheels 75 and 76. As the gear wheel 75 is axially reciprocated backwards and forwards across the fixed helical gear wheel 78, it will be rotated first in one direction and then in the other direction. Due, however to the interposition of the free wheel device 77 between the gear wheels 75 and 76, the helical gear wheel 76 will be rotated in one direction only. Consequently it is only when the lay shaft is moving in one direction that the gear wheel 76 will impart a drive to the driven shaft. Rotation of the gear wheel 76 will, of course, cause rotation of the gear wheel 79 and hence the driven shaft 62. As the gear train 76, 79 is in this construction helically toothed and of opposite angle to the gear train 75, 78, it follows that the reciprocation of the lay shaft 73 is also effective to produce rotation of the driven shaft which is thus twice what it would be if the gear train 76, 79 were straight toothed, as it may be. This, as explained above, will enable the inclination of the wobble plate necessary to secure any desired gear ratio to be halved—an important practical point, for certain applications.

The amount of drive applied to the driven shaft obviously depends upon the inclination of the wobble plate 70 and so any desired gear ratio may be obtained by adjustment of the plane of the wobble plate relative to the axis of the driving shaft.

Turning now to the embodiment of the present invention illustrated in Figure 6 of the accompanying drawings, this is similar in many respects to the gear illustrated in Figure 5, but is in a more practical form. The gear comprises an outer fixed gear support or casing 80 having spaced bearings 81 in which is journalled the driving shaft 82. Freely mounted in a trunnion 83 on the driving shaft 82 is a swash plate 84. A bracket 85 on the back of the swash plate 84 is connected by a link 86 to a sleeve 87 arranged around the driving shaft and axially slidable thereon. It will be seen that by sliding the sleeve 87 backwards and forwards along the driving shaft 82 the inclination of the swash plate 84 relative to the axis of the driving shaft may be varied at will and this, as in the previously described constructions, is used to vary the gear ratio. Any suitable means may be employed for sliding the sleeve 87 backwards and forwards along the driving shaft without departing from the scope of the present invention, the means shown comprising an externally grooved ring 88 mounted on a roller bearing 89 about the sleeve 87 so as not to be rotated thereby, the groove in this ring 88 being engaged by a fork or stirrup 90 carried by a shaft 91 which extends outside the casing where it is provided with means whereby it may be turned.

Each lay shaft, of which there may be three or more, but of which only one, 93, is shown in the drawing for the sake of simplicity and clearness, is slidably arranged in bearings 94 in webs in the casing 80 and, at the end nearest the swash plate, is provided with a slipper pad 95 of a suitable construction engaging with the swash plate. At the further end the lay shaft is subjected to the action of a compression spring 96 which serves to keep the slipper pad 95 in contact with the swash plate.

In other respects this form of the present invention is similar to that shown in Figure 5 and like reference numerals will, therefore, be used in the following description to indicate parts which are common to the two constructions. Each lay shaft 93 is provided with a pair of helically toothed gear wheels 75 and 76 of opposite angle, these gear wheels being rotatable on the lay shaft and being connected together by a free wheel or one-way drive device 77. The helical gear wheel 75 meshes with a helical gear wheel 78 which is fixed to the casing 80 at 98, whilst the helical gear wheel 76 meshes with a helical gear wheel 79 keyed to the driven shaft 62.

The gear operates in the same way as that illustrated in Figure 5 and further description of its operation is deemed to be unnecessary.

A more elaborate form of infinitely variable speed gear according to the present invention is illustrated in Figure 7 of the accompanying drawings. This construction has much in common with the constructions of gear illustrated in Figures 5 and 6, but as compared therewith it incorporates certain improvements notably in connection with the method of adjusting the swash or wobble plate and the method of transmitting the drive to the lay shafts.

The gear illustrated in Figure 7 comprises an outer fixed support or casing 100 having webs as required to support the internal gear wheels, a driving shaft 101 journalled in bearings 102, a driven shaft 103 journalled in bearings 104 and an output shaft 105 carried in bearings 106. The gearing indicated generally at B between the driven shaft 103 and the output shaft 105 is a standard reverse gear train. This may take any suitable form and constitutes no part of the present invention.

Inside the casing the driving shaft 101 is provided with a Z-portion 106 and beyond this Z-portion is extended, as at 107 for a purpose hereinafter described, the further end of the extension running in roller bearings 108.

Surrounding the Z-portion 106 of the driving shaft is a bush 109 bored non-axially at the same inclination as the centre of the Z-portion 106. A wobble ring 110 is disposed about the bush 109, being mounted on bearings 111 on the bush 109 so that it is not rotated despite the fact that the bush 109 is driven by the driving shaft 101. In order to prevent any tendency of the wobble plate to revolve, it may be provided with one or more stops 112 arranged between slides (one of which can be seen at 113) in the casing 100, these slides being such as to allow the wobble plate or ring 110 to wobble in the desired manner.

Now it will be seen that the amount of wobble applied to the wobble plate 110 will depend solely on the relative positions of the Z-shaft 106 and the bush 109. In the position shown in full lines in Figure 7, the eccentric bore of the bush counteracts the eccentricity of the Z-shaft and, in this position, the bush 109 will run concentrically round the axis of rotation of the driving shaft 101. This being so, no wobble will be imparted to the wobble plate 110 and, as in the constructions of gear hereinbefore described, we have here the neutral position of the gear.

If, however, the bush 109 be turned relative to the Z-shaft, its bore will no longer counteract the inclination of the Z-shaft and the bush will rotate not about the axis of rotation of the driving shaft but about an axis which is progressively more inclined to that axis as the bush is turned more and more with respect to the Z-shaft. The bush 109 then acts as a swash plate element and imparts a wobble to the wobble plate similar to the arrangement shown in Figure 5. Since as in this construction, as in the other constructions of gear according to the present invention, the gear ratio depends upon the amplitude of the movement of given points on the wobble plate, it will be appreciated that all that is required to produce an infinite variation of the gear ratio is to provide means whereby the position of the bush 109 about the Z-shaft may be gradually varied. The bush 109 and Z-shaft 106 under normal operating conditions rotate as one and what is required, therefore, is to provide some means for gradually turning the bush on the Z-shaft whilst they are rotating. This is somewhat complicated by the fact that the axis about which the bush 109 is rotating is not fixed but varies according to the gear ratio. The means now to be described, however, enable this adjustment to be carried out in a simple and very satisfactory manner.

Secured to the further end of the bush 109 is an annular bevel gear wheel 120 which is inclined to the axis of the bush 109 as shown. In other words, the bevel gear 120 lies at right angles to the axis of the eccentric bore in the bush 109. This bevel gear 120 is adapted to be engaged at one point by a bevel pinion 121 carried by a sleeve 122 about the extension 107 of the driving shaft. The sleeve 122 is carried in ball or like bearings 123 so that it is free to rotate with the driving shaft and is provided with one or more helical splines or grooves indicated at 124. The extension 107 of the driving shaft is similarly provided with one or more helical splines 125 of opposite angle, and the sleeve 122 and the extension 107 of the driving shaft are coupled together by a sleeve 126 having external and internal splines co-operating with the splines 124 and 125. It will thus be seen that, if the sleeve 126 be slidden axially along the extension 107 of the driving shaft, the sleeve 122 and bevel pinion 121 will be rotated relative to the driving shaft and, due to the engagement of the bevel pinion 121 with the bevel gear 120, the bush 109 will be rotated about the Z-shaft 106. In order to cause axial movement of the sleeve 126, a shaft 130 is suitably pivoted in the casing and is provided with an arm or the like 131 engaging with a thrust ring 132 journalled about the sleeve 126.

As the shaft 130 is rotated from outside the casing the sleeve 126 will be moved backwards and forwards and the desired adjustment will be secured.

It is not, of course, necessary that both sets of splines 124 and 125 should be helical. It is sufficient if one of them is straight. By making both sets helical and of opposite angle, however, any given axial movement of the sleeve 126 will produce a greater increased rotary movement of the bevel pinion 121 than would otherwise be secured and accordingly the length of travel of the sleeve 126, and with it the length of the extension 107 of the driving shaft, may be reduced.

The means of adjusting the angularity of a swash or wabble plate just described, although of a particular advantage in a variable speed gear according to the present invention, is not limited to this specific application but is applicable generally in all cases where it is desired to obtain a simple and very effective adjustment of a swash plate or wobble plate. For example, it is applicable to pumps which are driven by a swash plate or the like.

The remainder of the gear is very similar to the constructions previously described and, in order that this similarity may be the more apparent, like reference numerals have been used to indicate the corresponding parts.

Suitably spaced around the wobble plate 110 are three or more lay shafts 73, one only being shown on the drawing for the sake of simplicity and clearness. Each lay shaft 73 is connected to a cross head 140 adapted to move in slides 141, and each cross head 140 is connected to the appropriate point on the wobble plate 110 by means of a dumb-bell 142 mounted as shown. Operation of the wobble plate 110 will, therefore, cause reciprocation of the lay shafts 73, the amplitude of the oscillation (and hence the gear ratio as explained above) being controlled by the setting of the bush about the Z-shaft.

Rotatably mounted on the lay shaft 73 are two helically toothed gear wheels 75 and 76 of opposite angle coupled together by a roller clutch device 77, the gear wheel 75 being mounted on a sleeve 75a and the gear wheel 76 on a sleeve 76a.

The gear wheel 75 meshes with a helically toothed gear wheel 78 fixed to the casing, whilst the gear wheel 76 meshes with a helical gear wheel 79 keyed to the driven shaft 103. The gear wheels 78 and 79 are of opposite angle and the gear will operate as previously described in connection with Figures 4 to 6. Further description of the operation of the gear is deemed to be unnecessary.

It will be appreciated that in all constructions of gear according to the present invention it is possible to secure on over-drive by tilting the swash plate or wobble plate beyond the position which gives a 1 to 1 ratio. Care should, however, be taken in such cases to employ a suitable one-way drive device since in certain cases it will be found that an ordinary free wheel will not be satisfactory.

I claim:

1. Variable speed gearing comprising a support, a driven shaft rotatably mounted in said support, helical gear means fixed on said driven shaft, a plurality of helical gear means arranged in said support and parallel to and around said driven shaft and continuously in engagement with the gear means fixed thereto, each of said gear means in said support being axially movable in said support and being non-rotatable in one sense during movement in one direction and rotatable in that sense during movement in the opposite direction, wobbling means operatively connected with each of said gear means, a driving shaft connected to said wobbling means and means for varying the angularity of said wobbling means.

2. Variable speed gearing comprising a support, a driven shaft rotatably mounted in said support, helical gear means fixed on said driven shaft, a plurality of lay shafts rotatable in one direction only in said support parallel to and around said driven shaft, a plurality of helical gear means one for each lay shaft and non-rotatably slidable thereon and in continuous engagement with said gear means fixed to said driven shaft, wobbling means operatively connected with each of said gear means, a driving shaft connected to said wobbling means and means for varying the angularity of said wobbling means.

3. Variable speed gearing comprising a support, a driven shaft rotatably mounted in said support, a helical gear fixed to said driven shaft, a plurality of lay shafts slidably mounted in said support, a helical gear in continuous mesh with said gear fixed on said shaft and slidable with and rotatable on a lay shaft, wobbling means connected to each lay shaft, a driving shaft connected to said wobbling means, means for varying the angularity of said wobbling means, and means reacting against said support for turning said gear on each of said lay shafts during sliding in one direction.

4. Variable speed gearing comprising a support, a driven shaft rotatably mounted in said support, helical gear means fixed on said driven shaft, a plurality of lay shafts rotatable in one direction only in said support parallel to and around said driven shaft, a plurality of sleeves each splined to a lay shaft and each carrying a helical gear in continuous mesh with said gear on said driven shaft, wobbling means connected to said sleeves, a driving shaft connected to said wobbling means, and means for varying the angularity of said wobbling means.

5. Variable speed gearing comprising a support, a driven shaft rotatable in said support and carrying a fixed helical gear, lay shafts arranged in said support parallel to and around said driven shaft and gear and rotatable in one direction, sleeves each splined to a lay shaft for reciprocation thereon and each carrying a fixed helical gear in continuous mesh with said gear on said driven shaft, wobbling means connected to said sleeves for reciprocating same and its gear, a drive shaft connected to said support and wobbling means, and means for varying the angularity of said wobbling means.

6. Variable speed gearing comprising a support, a driven shaft rotatable in said support and carrying a fixed helical gear, lay shafts arranged in said support parallel to and around said driven shaft and gear, means each for preventing rotation of a lay shaft in one direction, sleeves each splined to a lay shaft for reciprocation thereon and each carrying a fixed helical gear in continuous mesh with said gear on said driven shaft, wobbling means connected to said sleeves for reciprocating same and its gear, a drive shaft connected to said support and wobbling means, and means for varying the angularity of said wobbling means.

7. Variable speed gearing comprising a support, a driven shaft rotatably mounted in said support, helical gear means fixed on said driven shaft, a plurality of lay shafts rotatable in one direction only in said support parallel to and around said driven shaft, a plurality of helical gear means one for each lay shaft and non-rotatably slidable thereon and in continuous engagement with said gear means fixed to said driven shaft, sleeves guided in said support and each connected to the gear means on a lay shaft, wobbling means connected to said sleeves, a driving shaft connected to said wobbling means and means for varying the angularity of said wobbling means.

8. A variable speed gearing comprising a fixed support, a helical gear on said support, a driven shaft rotatable in said support, a helical gear fixed to said driven shaft, a plurality of lay shafts slidably mounted in said support, a plurality of helical gears each rotatably mounted on a lay shaft and in continuous mesh with said gear fixed on said support, a plurality of second helical gears rotatably mounted on a lay shaft and each rotated by one of said first gears on its lay shaft in one direction and in mesh with said gear on said driven shaft, wobbling means for sliding said lay shafts back and forth, a driving shaft driving said wobbling means, means for varying the angularity of the wobbling means whereby the angle of inclination of the wobbling means to produce a given gear ratio is reduced.

9. Variable speed gearing comprising a fixed support, a helical gear fixed on said support, a driven shaft rotatable in said support, a gear fixed to said driven shaft, a plurality of lay shafts slidably mounted in said support, a plurality of helical gears in continuous mesh with said gear fixed on said support and each rotatable on a lay shaft, a plurality of second gears in mesh with said gear fixed to said driven shaft and each rotatable on a lay shaft and rotated in one direction by one of said first helical gears on the same lay shaft, wobbling means for sliding said lay shafts back and forth, a driving shaft driving said wobbling means, and means for varying the angularity of the wobbling means.

10. A variable speed gearing comprising a fixed support, a helical gear on said support, a driven shaft rotatable in said support, a helical gear fixed to said driven shaft, a plurality of lay shafts slidably mounted in said support, a plurality of helical gears each rotatably mounted on a lay shaft and in continuous mesh with said gear fixed on said support, a plurality of second helical gears rotatably mounted on a lay shaft and each rotated by one of said first gears on its lay shaft in one direction and in mesh with said gear on said driven shaft, said gear on said driven shaft and each second gear on a lay shaft being of an angle opposite to that of said gear fixed on said support and first gear on a lay shaft, respectively, wobbing means for sliding said lay shafts back and forth, a driving shaft driving said wobbling means, means for varying the angularity of the wobbling means whereby the angle of inclination of the wobbling means to produce a given gear ratio is reduced.

11. Variable speed gearing comprising a fixed support, a helical gear fixed on said support, a driven shaft rotatable in said support, a gear fixed to said driven shaft, a plurality of lay shafts slidably mounted in said support, a plurality of helical gears in continuous mesh with said gear fixed on said support and each rotatable on a lay shaft, a plurality of second gears in mesh with said gear fixed to said driven shaft and each rotatable on a lay shaft and rotated in one direction by one of said first helical gears on the same lay shaft, wobbling means for sliding said lay shafts back and forth, said wobbling means comprising a non-rotatable wobble ring and a rotatable wobble element, a driving shaft connected to said wobble element and means for varying the angularity of the wobble element.

12. Variable speed gearing comprising a fixed support, a helical gear fixed on said support, a driven shaft rotatable in said support, a gear fixed to said driven shaft, a plurality of lay shafts slidably mounted in said support, a plurality of helical gears in continuous mesh with said gear fixed on said support and each rotatable on a lay shaft, a plurality of second gears in mesh with said gear fixed to said driven shaft and each rotatable on a lay shaft and rotated in one direction by one of said first helical gears on the same lay shaft, a slipper pad each on one end of a lay shaft, wobbling means engaging said slipper pads, resilient means coacting with the opposite end of a lay shaft and said support for urging a slipper pad toward said wobbling means, a driving shaft actuating said wobbling means and means for varying the angularity of said wobbling means.

13. Variable speed gearing comprising a fixed support, a helical gear fixed on said support, a driven shaft rotatable in said support, a gear fixed to said driven shaft, a plurality of lay shafts slidably mounted in said support, a plurality of helical gears in continuous mesh with said gear fixed on said support and each rotatable on a lay shaft, a plurality of second gears in mesh with said gear fixed to said driven shaft and each rotatable on a lay shaft and rotated in one direction by one of said first helical gears on the same lay shaft, wobbling means for sliding said lay shafts back and forth, said wobbling means comprising a non-rotatable wobble ring and a rotatable wobble element, said wobble element forming a bush with bore slanting to its axis, a driving shaft having a Z-portion fitting said bore and means for varying the angularity of the wobbling means, said varying means including means for rotating the bush relative to said Z-portion.

14. A variable speed gearing according to claim 13 and wherein the means for rotating said bush relative to said driving shaft comprises a gear ring mounted on said bore at right angles to the axis of its bore, a further gear engaging said gear ring and disposed about the driving shaft, and means for rotating said further gear relative to said driving shaft.

15. Variable speed gearing according to claim 14 and wherein the further gear is mounted on a sleeve surrounding said driving shaft and helically splined thereto and in which rotary movement of the sleeve and further gear is caused by a control sleeve axially slidable about said driving shaft and engaging with said splines.

16. Variable speed gearing according to claim 15 and wherein both said sleeve and driving shaft are provided with helical splines of opposite angle whereby the axial movement of said sleeve necessary to produce a given rotation of the further gear is reduced.

REGINALD WARREN.

REFERENCES CITED

The following references are of record in the file of this patent:

UNITED STATES PATENTS

| Number | Name | Date |
|---|---|---|
| 1,799,167 | Hulsebos | Apr. 7, 1931 |
| 1,819,715 | Le Bret | Aug. 18, 1931 |
| 1,869,189 | Eggert | July 26, 1932 |
| 1,957,359 | Schipper | May 1, 1934 |

FOREIGN PATENTS

| Number | Country | Date |
|---|---|---|
| 766,613 | France | July 2, 1934 |